3,069,427
PROCESS OF MAKING PYRIDYLACETIC ACIDS AND ESTERS
Francis E. Cislak, Indianapolis, Ind., assignor to Reilly Tar & Chemical Corporation, Indianapolis, Ind., a corporation of Indiana
No Drawing. Filed Apr. 13, 1960, Ser. No. 21,902
7 Claims. (Cl. 260—295)

My present invention relates to a process of preparing pyridylacetic acids and their alkyl esters. More specifically, my invention relates to a process of preparing pyridylacetic acids and their esters by the interaction of a picolyldialkylamine and an aliphatic acid anhyride.

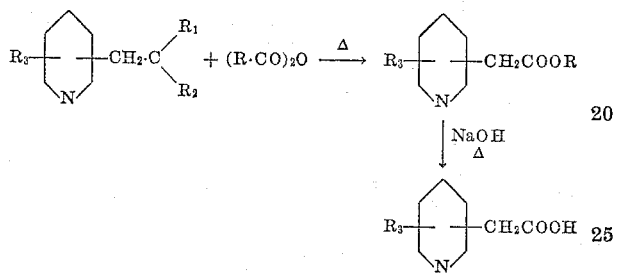

In the equation above R, $R_1$, and $R_2$ are lower alkyl; they may be alike or different. $R_3$ is hydrogen or lower alkyl.

Several methods for the preparation of pyridylacetic acid are reported in the literature. 2-pyridylacetic acid has been prepared by the carbonation of 2-picolyllithium [Woodward et al., Organic Syntheses, 29, 44 (1949]. The yields are low, and the preparation of the 2-picolyllithium is expensive and time consuming. In a somewhat analogous manner, 4-pyridylacetic acid has been prepared by the reaction of 4-picolyllithium with ethylchloroformate [Zimmer et al., Ber. 2285 (1956)]. 2-vinylpyridine reacts with ammonium polysulfide to give 2-pyridylacetamide which has been hydrolyzed to 2-pyridylacetic acid [Pattison et al., J. Am. Chem. Soc., 68, 2033 (1946)]. Acetylpyridines has been reacted with morpholine and sulfur to give the corresponding thiomorpholides, which may be hydrolyzed to yield the pyridylacetic acids [Malan et al., J. Am. Chem. Soc., 69, 1797–8 (1947)]. This last method is useful for the preparation of laboratory quantities of the three pyridylacetic acids. Because of the commercial unavailability of the acetylpyridines, the method is not practical for the large-scale preparation of the pyridylacetic acids or their esters.

The ready availability of the picolylamines and the ease of converting them to the picolyldialkylamines by reductive alkylation with aldehydes makes the picolyldialkylamines useful starting materials for the preparation of pyridylacetic acids and their esters.

Illustrative of the manner in which my invention may be practiced, I cite the following examples. The parts are by weight.

EXAMPLE 1

3-Pyridylacetic Acid and Methyl-3-Pyridylacetate

A mixture of 136 parts of 3-picolyldimethylamine and 200 parts of acetic anhydride is heated under reflux conditions for from about 6 to about 20 hours. During the reflux period there are formed methyl-3-pyridylacetate and N-dimethylacetamide. After the refluxing period is concluded, the methyl-3-pyridylacetate formed is separated from the reaction mixture in any convenient manner. One way of isolating the methyl-3-pyridylacetate is to subject the reaction mixture to fractional distillation under vacuum. The unreacted acetic anhydride distills over first, then the dimethylacetamide distills over, and finally the methyl-3-pyridylacetate is distilled over.

The methyl-3-pyridylacetate may be converted into 3-pyridylacetic acid by conventional hydrolysis.

In place of the acetic anhydride I may use other aliphatic acid anhydrides, such for example as propionic anhydride and obtain ethyl-3-pyridylacetate.

In place of the 3-picolyldimethylamine, I may use other 3-picolyldialkylamines, such as, for example, 3-picolyldiethylamine.

EXAMPLE 2

Methyl-4-Pyridylacetate and 4-Pyridylacetic Acid

The procedure of Example 1 is repeated with the exception that I use 4-picolyldimethylamine in place of the 3-picolyldimethylamine and I recover methyl-4-pyridylacetate which I hydrolyze to 4-pyridylacetic acid if desired.

EXAMPLE 3

Methyl-2-Pyridylacetate and 2-Pyridylacetic Acid

The procedure of Example 1 is repeated with the exception that I use 2-picolyldimethylamine in place of the 3-picolyldimethylamine, and I recover methyl-2-pyridylacetate which I hydrolyze to 2-pyridylacetic acid if desired.

EXAMPLE 4

3-(2-Ethylpyridyl)Acetic Acid and Methyl-3-(2-Ethylpyridyl)Acetate

The procedure of Example 1 is repeated with the exception that I use 3-(2-ethylpicolyl)dimethylamine in place of the 3-picolyldimethylamine, and I recover methyl-3-(2-ethylpyridyl)acetate which I hydrolyze to 3-(2-ethylpyridyl)acetic acid if I so desire.

In the process of preparing pyridylacetic acid my invention resides in the step comprising heating a mixture of a picolyldialkylamine with an aliphatic acid anhydride to form an alkyl pyridylacetate. The alkyl pyridylacetate may be isolated from the reaction mixture. If the pyridylacetic acid is desired, it may be obtained by the hydrolysis of the alkyl pyridylacetate in the reaction mixture, or the alkyl pyridylacetate may be isolated and then converted to the pyridylacetic acid.

In general, I prefer to carry out my reaction batch-wise. I may, however, if desired conduct it in a continuous manner.

EXAMPLE 5

3-Pyridylacetic Acid and Methyl-3-Pyridylacetate

I prepare a mixture 150 parts of 3-picolylamine and 300 parts of acetic anhydride. I pump this mixture, under superatmospheric conditions, through a tubular reactor maintained at a temperature of from about 150° C. to about 250° C. As the liquid mixture passes through the reactor, methyl 3-pyridylacetate is formed. The methyl-3-pyridylaceate is recovered as in Example 1 and if desired, hydrolyzed to 3-pyridylacetic acid.

If I desire, I may vaporize the mixture of picolylamine and acetic anhydride and pass the mixture of vapors through a reactor maintained at an elevated temperature of from about 150° C. to aobut 400° C.

I claim as my invention:

1. The process of preparing alkyl pyridylacetates which compounds have the formula

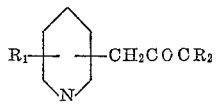

wherein $R_2$ represents lower alkyl and $R_1$ is selected from the group consisting of hydrogen and lower alkyl, which comprises heating, at about a temperature above the boiling point, a mixture of picolyldialkylamine having the formula

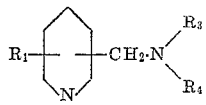

wherein $R_3$ and $R_4$ represent lower alkyl and $R_1$ is selected from the group consisting of hydrogen and lower alkyl and lower aliphatic acid anhydride.

2. The process of preparing methyl-3-pyridylacetate which comprises heating, at about a temperature above the boiling point, a mixture of 3-picolyldimethylamine and acetic anhydride.

3. The process of preparing methyl-4-pyridylacetate which comprises heating, at about a temperature above the boiling point, a mixture of 4-picolyldimethylamine and acetic anhydride.

4. The process of preparing methyl-2-pyridylacetate which comprises heating, at about a temperature above the boiling point, a mixture of 2-picolyldimethylamine and acetic anhydride.

5. In the process of preparing pyridylacetic acids, the step which comprises heating, at about a temperature above the boiling point, a mixture of picolyldialkylamine having the formula

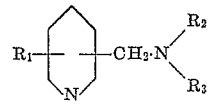

wherein $R_1$ is selected from the group consisting of hydrogen and lower alkyl, and $R_2$ and $R_3$ represent lower alkyl and lower aliphatic acid anhydride.

6. In the process of preparing pyridylacetic acids, the step which comprises heating, at about a temperature above the boiling point, a mixure of a picolyldimethylamine and acetic anhydride.

7. The process of preparing alkylpyridylacetates which compounds have the formula

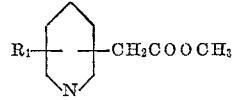

wherein $R_1$ is selected from the group consisting of hydrogen and lower alkyl which comprises heating, at about a temperature above the boiling point, a mixture of picolyldimethylamine having the formula

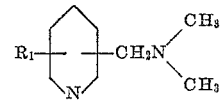

wherein $R_1$ is selected from the group consisting of hydrogen and lower alkyl and acetic anhydride.

No references cited.